United States Patent

[11] 3,615,754

[72] Inventor William W. Gotshall
    3081 Walma Drive, Orchard Lake, Mich.
    48033
[21] Appl. No. 786,386
[22] Filed Dec. 23, 1968
[45] Patented Oct. 26, 1971

[54] PREPARATION OF NONBLEEDING INK COMPOSITIONS
7 Claims, No Drawings

[52] U.S. Cl. ..................................... 106/30,
    106/32, 106/239, 106/241, 106/285, 106/307,
    106/308, 260/37
[51] Int. Cl. ..................................... C09d 11/08,
    C09d 11/00
[50] Field of Search ......................... 106/19–32,
    285, 307, 308, 309, 239, 245; 23/209.1; 260/37,
    38, 39–41.5

[56] References Cited
UNITED STATES PATENTS
2,700,642 1/1955 Mattox .................. 106/284 UX
3,391,103 7/1968 Mueller .................. 106/307

OTHER REFERENCES
Ellis, Printing Inks, their Chemistry and Technology, N.Y. Reinhold Publishing Co., 1940, TP 949 E 47, pages 216 to 217 relied on.

Primary Examiner—Julius Frome
Assistant Examiner—Joan B. Evans
Attorneys—Joseph C. Herring, Jack L. Hummel and Richard C. Willson, Jr.

ABSTRACT: Nonbleeding ink compositions are prepared comprising a liquid vehicle in which 2 percent to about 10 percent by weight of a carbonaceous material having a benzene discoloration test of not less than about 98 percent is suspended. The carbonaceous particles are produced by coking a petroleum fraction, then calcining the petroleum coke to a volatile combustible hydrocarbon content of less than about 3 percent by weight based on the weight of the coke, then comminuting the resulting product to a particle size of 100 percent less than 2.5 microns and at least 50 percent less than 1.5 microns.

The carbon particles are dispersed in a liquid vehicle or varnish comprised of a highly paraffinic oil having a viscosity of from 5 to 10 centipoise at 60° F. in amounts of 2 percent to about 10 percent by weight based on the total weight of the coke and the vehicle. The ink pigment prepared in accordance with the invention preferably has a Cabot Nigrometer rating of from about 80 to about 100.

PREPARATION OF NONBLEEDING INK COMPOSITIONS

BACKGROUND OF THE INVENTION

1. Field of the Invention

Art generally pertinent to this invention may be found in United States Patent Classifications 106–20+, ink compositions, and 73–150, the testing of ink compositions.

2. Description of the Prior Art

Printing inks consist of an intimately ground mixture of pigment, varnish and solvent. The problems inherent in manufacturing a printing ink which will not migrate through to the reverse side of unsized paper are well known. It has been the tendency in the art to attempt to improve the ink vehicle or varnish which binds the ink pigment to the paper, and thereby prevent "bleeding" in this manner. Nevertheless, "ink bleedthrough" remains a problem, especially where the ink formulation must be applied to very thin paper. The problem is magnified in direct proportion to the porosity of the paper utilized. The advantage of this invention is that conventional ink vehicles may be employed with little or no variation from standard use; rather, the improvement is obtained in the preparation of the carbonaceous matter which is used as a basic ingredient of the ink pigment.

SUMMARY

General Statement of the Invention

Nonbleeding ink compositions are prepared by suspending in a liquid vehicle from about 2 percent to about 10 percent by weight of ground coke which has been calcined to a volatile combustible hydrocarbon content not above about 5 percent by weight and preferably less than about 2 percent by weight, the particles of carbon formed being less than about 325 mesh, a substantial quantity of these particles being less than 1.5–2.5 microns in size.

In a preferred embodiment of the invention, petroleum coke is formed in a conventional delayed-coking apparatus, and is then calcined for about 20 minutes at approximately 1,500° F. in order to reduce the volatile combustible hydrocarbon content to about 5 percent by weight. Then, this coke is ground preferably in a Raymond roller mill or similar type mill, such as a ball mill, and thereafter ground in a fluid energy mill to the particle size specified. The ground calcined coke particles are dispersed in a liquid ink vehicle in an amount of from 2 percent to about 10 percent by weight based on the total weight of the coke and the vehicle. This ink is suitable for use with high-speed letterpress rotaries which require very thin inks having a viscosity of 7 poise or less.

UTILITY OF THE INVENTION

The utility of nonbleeding inks will be immediately obvious to those skilled in the art. They are particularly useful when printing on highly absorbent paper, such as on newsprint, and the like.

DESCRIPTION OF THE PREFERRED EMBODIMENTS

The carbonaceous particles of this invention are produced by coking a petroleum fraction boiling in the range of from about 700° F. and above, but a petroleum fraction with an initial boiling point in the range of 1,000° F. and above is preferable; then, calcining this petroleum coke for about 30 minutes at approximately 1,150° F., preferably at above about 1,200° F. and most preferably at above about 1,250° F., to reduce the volatile combustible hydrocarbon content of the coke to less than about 2 percent by weight based on the weight of the coke. Any coke, such as fluid petroleum coke, delayed petroleum coke, coal or pitch coke, may be used with the invention, provided that the coke is ultimately reduced to the volatile combustible hydrocarbon content specified, namely to about 2 percent by weight based on the weight of the coke. However, either fluid petroleum coke or delayed petroleum coke is preferable, and fluid coke is most preferable for use with the invention.

Coke manufactured in a fluid coker may not need to be calcined prior to use with the invention inasmuch as the volatile combustible hydrocarbon content in fluid coke is low enough after coking, usually 3 percent by weight. In such a case, the fluid coke need only be comminuted to the correct specifications previously set forth.

The calcined product or fluid coke product is then successively comminuted in a Raymond roller mill and a fluid energy mill to an average particle size of 100 percent less than 2.5 microns and at least 50 percent less than 1.5 microns, preferably, 100 percent less than 2.0 microns and 50 percent less than 1.0 microns. In general, an oxygen-containing gas is the preferred grinding fluid in the fluid energy mill. The operating conditions here are not overly critical and are well known in the art. John Perry's Chemical Engineer's Handbook, 3rd Ed., published by the McGraw-Hill Book Co. (1950), pp. 1145–1146, contains reference material on fluid energy or jet mills. Preferred fluid energy mills include the Micronizer manufactured by the Micronizer Co., the Reductionizer manufactured by the Reduction Engineering Corporation, the Fluid Energy Reduction Mill manufactured by the C. H. Wheeler Manufacturing Co., and the Eagle Mill. For further data see Industrial Engineering Chemistry, V. 38 (1946), p. 672.

The volatile combustible hydrocarbon content of the calcined coke is determined by a Gas Chromatograph, a scientific instrument manufactured by the Fisher Scientific Co. of Pittsburgh, Pa., and by others. Volatile combustible hydrocarbon content is normally made up of hydrogen, methane, traces of ethane and other hydrocarbon gases.

The average particle size of the carbonaceous material may be accurately measured with a Fisher Electric Sub-sieve Sizer manufactured by the Fisher Scientific Co. or by electron microscopic evaluation. See "Cabot Carbon Blacks under Electron Microscope", 2nd Ed., published by Godfrey L. Cabot, Inc., Boston, Mass. (1950). A Hegman Grind Gauge or a Production Grindometer developed by the National Printing Ink Research Institute, and manufactured by Precision Gauge & Tool Co., Dayton, Ohio, may also be employed for this purpose. An appropriate testing procedure for the Grindometer is found in V. 21, 1966 ASTM Standards, D–1316–547, p. 250.

The jetness of the carbon black dispersions is measured by a Cabot Nigrometer manufactured by Godfrey L. Cabot, Inc., which compares the intensity of light reflected by the dispersion with the intensity of light from a constant and known source. (See Rubber Chemistry and Technology, V. 30, No. 5, published by the American Chemical Society (1957) pp. 1411–1412, for test procedures.)

Ink viscosity may be gauged by a rotational viscometer, such as the Brookfield "Syncrolectric" Rotational Viscometer, the Gallenkamp Torsion Viscometer manufactured by A. Gallenkamp & Co., Ltd.; or the Laray Falling-Bar Viscometer manufactured by Columbian International Ltd. Consult Ink Technology for Printers and Students, E. A. Apps, V. I. Chemical Publishing Co., Inc., New York, N.Y. (1964) pp. 204–208.

Any liquid varnish which is conventionally used with ink formulations may be utilized here, such as a composition of natural resins (rosin oil, tall oil, shellac, zein); modified natural resins (ester gum, lime-hardened rosin); synthetic resins (alkyds such as glyceryl phalate); rosin maleic anhydride resins; phenol formaldehyde resins; modified phenolic resins; vinyl resins; polyacrylic and polymethacrylic resins; silicone resins; epoxy resins; rubber resins, etc.; mixed with solvents such as natural petroleum (naphtha or benzene fractions with boiling points up to 150° C., paraffin oil or kerosene, boiling up to 150°–300° C., and lubricating oil boiling above 300° C); petroleum ether, coal tar hydrocarbons; mineral oils (usually having a boiling range from about 260°–345° C.); turpentine, pine oils or alcohol solvents such as ethanol, butanol, isopropanol, methyl isobutyl carbonol and diacetone alcohol, or dical or gylcol solvents such as ethylene glycol, diethylene glycol, propylene glycol, piperethylene glycol, hexalene glycol, diethyl ether; etc., with rubber adhesives or waxes which a particular ink formulation may require. A more complete list of suitable varnish compositions and a description of their properties may be found in Ink Technology for Printers and Students, by E. A. Apps, published by the Chemical Publishing Co., Inc., 212 5th Ave., New York, N.Y., (1964), pp. 65–95.

For purposes of the invention, a liquid vehicle or varnish made up of a highly paraffinic oil is preferable, and a paraffinic oil vehicle having a viscosity of from 5 to about 10 centipoise at 60° F. is most preferable. The ground calcined coke particles should be dispersed in the liquid vehicle in an amount of from 2 percent to about 10 percent by weight based on the total weight of the coke and the vehicle, but preferably such particles should be present in the vehicle in an amount of from 4 to about 7 percent by total weight and most preferably in an amount of from 4 percent to about 5 percent by total weight of the coke and the vehicle.

In order to be used with the invention, the carbonaceous material described must have a benzene discoloration test of not less than 98 percent, preferably not less than 99 percent, and most preferably about 99.9 percent. The discoloration test, ASTM No. D–1618–65 is found in ASTM Standards, pp. 761—762, V. 15, 1967.

This invention as practiced by skilled printers will produce a printed sheet forming a clear, readable text.

It should be realized that the ground, calcined coke of this invention may also be successfully utilized in other ways. Carbonaceous matter prepared in accordance with the invention may be used in the manufacture of carbon paper, typewriter ribbons, various coatings and plastics, and in ink formulations used in reproducing and copying machines. An extensive report on the use of carbon black dispersions in the paper industry is contained in an article by I. Drogin, Paper Trade Journal, V. 147, pp. 24–27 Apr. 1, 1963).

Of special importance, carbon particles prepared as specified may be used in xerographic toners manufactured for copying machines which employ a solid, meltable resin. For example, toners comprising a resin-pigment blend are described in U.S. Pat. No. 3,080,318 to Claus; British Pat. No. 944,401; U.S. Pat. No. 2,892,794 assigned to Xerox Corporation; U.S. Pat. No. 2,919,247 assigned to The Haloid Corporation; U.S. Pat. Nos. 2,940,934 and 2,965,593 assigned to Haloid-Xerox Corporation; and U.S. Pat. No. 3,090,755 assigned to International Business Machines Corporation. Compositions differ in each case but generally these xerographic toners comprise from about 40 to about 65 percent resin and from about 2 to about 35 percent carbon black or dye pigment.

The invention may be more fully understood by referring to the following non limiting examples.

EXAMPLE I

A petroleum fraction boiling above 1,000° F. is coked in a delayed coker. The petroleum coke is then calcined in a rotary kiln for 20 minutes at about 1,500° F. to a volatile combustible hydrocarbon content of 2 percent by weight. The calcined product is successively comminuted in a Raymond roller mill and a fluid energy reduction mill to a particle size of 2.5 microns or less. Particle size is confirmed by Fisher Sub-Sieve Analysis. According to ASTM Test No. D–1618–65, these particles are found to have a benzene discoloration test of 98 percent.

These particles are then dispersed in a liquid vehicle, or varnish, primarily composed of a paraffinic oil, namely a mineral oil boiling at 575° F. and having a viscosity of 10 centipoise at 60° F., the carbonaceous particles being dispersed in the vehicle in an amount of 5 percent by weight, based on the total weight of the particles and the vehicle. The ink pigment thus prepared has a Cabot Nigrometer reading of 81.

EXAMPLE II

The fluid coke used in this example has a volatile combustible hydrocarbon content of 3 percent by weight. This coke is successively comminuted in a ball mill and a reductionizer mill, where steam is used as the grinding fluid, to a volatile combustible hydrocarbon content of 3 percent by weight which is determined by Fisher Gas Chromatograph Analysis. Electron microscopic evaluation reveals the size of the carbonaceous particles to be from 0.01 microns to 2.5 microns.

These particles are subsequently dispersed in a varnish primarily composed of a paraffinic oil, a kerosene fraction boiling at 500° F. and having a viscosity of 7 centipoise at 60° F., the particles being dispersed in the varnish in an amount of 4 percent by weight based on the total weight of the particles and the vehicle. The ink pigment is found to have a Cabot Nigrometer reading of 84.

MODIFICATIONS OF THE INVENTION

It should be apparent that the invention is capable of a variety of modifications and variations which are to be included within the spirit of the claims appended hereto.

What is claimed is:

1. An improved process for the preparation of a nonbleeding ink comprising dispersing a carbonaceous pigment in an organic vehicle having a viscosity of from about 5 to about 10 centipoises at 60° F., the improvement comprising using as the carbonaceous pigment comminuted calcined coke containing less than about 2 percent by weight of volatile combustible hydrocarbons and having a particle size of 100 percent less than 2 microns and at least 50 percent less than 1.5 microns, said comminuted calcined coke particles being present in an amount of from about 2 to about 10 percent by weight based on the total weight of the coke and the vehicle.

2. The process of claim 1 wherein a major portion of the comminution of the carbon product is accomplished under fluid energy.

3. The process of claim 2 wherein the fluid energy comminution comprises using an oxygen-containing gas grinding fluid.

4. The process of claim 1 wherein the vehicle is a highly paraffinic oil.

5. A carbon paper comprising a paper substrate coated with an ink prepared by the process of claim 1.

6. The process of claim 1 wherein the organic vehicle comprises resin selected from the group consisting of natural resins, modified natural resins and synthetic resins.

7. The process of claim 6 wherein the resin is mixed with a solvent selected from the group consisting of petroleum ether, mineral oils, turpentine, pine oil, alcohols, and diethyl ether.

* * * * *